United States Patent [19]
Grabbe et al.

[11] Patent Number: 5,869,327
[45] Date of Patent: *Feb. 9, 1999

[54] APPARATUS FOR THE BIOLOGICAL TREATMENT OF SUBSTANCES AND/OR MIXTURES OF SUBSTANCES IN CLOSED ROTTING REACTORS

[76] Inventors: Klaus Grabbe, Tiergarten 24, 38116 Braunschweig; Lothar Schaar, am Südbach 34, 31700 Heuerssen; Andreas Deutsch, Haseudamm 79, 31275 Lehrle-Aspke, all of Germany

[*] Notice: The term of this patent shall not extend beyond the expiration date of Pat. No. 5,693,528.

[21] Appl. No.: 646,353

[22] PCT Filed: Nov. 11, 1993

[86] PCT No.: PCT/EP93/03167

§ 371 Date: Aug. 28, 1996

§ 102(e) Date: Aug. 28, 1996

[87] PCT Pub. No.: WO95/13254

PCT Pub. Date: May 18, 1995

[51] Int. Cl.⁶ ................................................ C05F 17/02
[52] U.S. Cl. .................... 435/286.6; 435/290.1; 435/290.2; 435/818
[58] Field of Search ............... 435/290.1–290.4, 435/286.6, 818; 71/9

[56] References Cited

U.S. PATENT DOCUMENTS 3,138,448  6/1964  Schulze .......................................... 71/9

5,693,528  12/1997  Grabbe et al. ........................ 435/286.6

FOREIGN PATENT DOCUMENTS

| 0 107 925 | 5/1984 | European Pat. Off. . |
| 0 296 645 | 12/1988 | European Pat. Off. . |
| 40 22 328 | 6/1991 | Germany . |
| 92/07807 | 5/1992 | WIPO . |
| 93/23350 | 11/1993 | WIPO . |
| 93/23351 | 11/1993 | WIPO . |

OTHER PUBLICATIONS

Lechner et al. World Patent Index Abstract No. 890086953 of DE 3830177 (Mar. 1989).

Still Fa Carl. World Patent Index Abstract No. 77–47087Y of DE 2057413 (Jun. 1977).

*Primary Examiner*—William H. Beisner
*Attorney, Agent, or Firm*—Finnegan, Henderson, Farabow, Garrett & Dunner, L.L.P.

[57] ABSTRACT

A process and apparatus is disclosed for the biological treatment, in particular composting, of biogenic and abiogenic substances and/or mixtures of substances in a compost pile in the presence of biologically active components such as microorganisms. The process occurs in a closed reactor having a plurality of reactor zones, namely the compost pile itself and at least one reactor gas space adjacent to the compost pile. Rotting conditions, changes in rotting conditions and/or process parameters in the compost pile are adjusted, maintained, controlled or regulated, steady-state, quasi-steady-state and/or non-steady-state operation of the reactor.

29 Claims, 9 Drawing Sheets

FIG. 1
CONVERSION DYNAMICS DURING COMPOSTING

| | \multicolumn{15}{c}{FLOW VARIANTS} |
|---|---|---|---|---|---|---|---|---|---|---|---|---|---|---|---|

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| V1 | 1 | 1 | 1 | 1 | 1 | 1 | 1 | 1 | 1 | 1 | 1 | 1 | 1 | 1 | 1 |
| V2 | 0 | 0 | 0 | 0 | 0 | 0 | 0 | 0 | 0 | 1 | 1 | 0 | 0 | 1 | 1 |
| R13 | 0 | 0 | 0 | 0 | 0 | 0 | 0 | 0 | 0 | 1 | 1 | 0 | 0 | 1 | 1 |
| R11 | 1 | 1 | 1 | 1 | 1 | 1 | 1 | 1 | 1 | 1 | 1 | 1 | 1 | 1 | 1 |
| R2 | 0 | 1 | 0 | 1 | 1 | 1 | 1 | 1 | 1 | 1 | 0 | 0 | 1 | 1 | 1 |
| R4 | 0 | 1 | 0 | 1 | 1 | 1 | 0 | 1 | 1 | 0 | 1 | 0 | 1 | 0 | 0 |
| R10 | 1 | 0 | 1 | 0 | 0 | 0 | 0 | 0 | 0 | 1 | 1 | 1 | 0 | 1 | 0 |
| R5 | 0 | 0 | 1 | 0 | 0 | 0 | 0 | 0 | 0 | 0 | 0 | 1 | 1 | 0 | 0 |
| R9 | 0 | 0 | 0 | 1 | 1 | 1 | 0 | 1 | 0 | 1 | 0 | 0 | 1 | 0 | 0 |
| R12 | 1 | 0 | 1 | 1 | 1 | 0 | 1 | 0 | 1 | 0 | 1 | 1 | 1 | 1 | 0 |
| R8 | 0 | 1 | 1 | 1 | 1 | 1 | 1 | 1 | 1 | 1 | 1 | 0 | 0 | 0 | 1 |
| R14 | 1 | 1 | 0 | 0 | 1 | 1 | 1 | 1 | 1 | 1 | 1 | 1 | 0 | 1 | 1 |

*FIG. 5*

V FAN (0-OFF, 1-ON)
R CONTROL VALVE (0-CLOSED, 1-OPEN)

APPARATUS FOR THE BIOLOGICAL TREATMENT OF SUBSTANCES AND/OR MIXTURES OF SUBSTANCES IN CLOSED ROTTING REACTORS

BACKGROUND OF THE INVENTION

1. Field of the Invention

The invention relates to a process and an apparatus for the biological treatment, in particular composting, of biogenic and abiogenic substances and/or mixture of substances in a clamp in the presence of biologically active components, in particular microorganisms, in a closed reactor having a plurality of reactor zones.

2. Description of the Related Art

Such processes and plants are known, for example as industrial composting processes and composting plants in a very wide range of embodiments. The rotting, i.e. composting, of biogenic organic and abiogenic substances under aerobic conditions results in the formation of heat and metabolic gases which have to be removed via aeration (ventilation) systems. Usually, fresh air flows through the rotting mixture and the corresponding waste air is blown out. Oxygen is introduced in an uncontrolled manner with the fresh air supply, and moisture and heat are removed with the waste air. Gas, humidity and/or temperature gradients result which cannot be influenced and, owing to the network of operating and process parameters, are suitable only for describing the process.

Thus, important process aims cannot be achieved by means of these conventional aeration systems. If water discharge is desired, heat is thus simultaneously removed in an uncontrolled manner. Thus, on the one hand the desired moisture contents cannot be maintained and on the other hand important predetermined temperatures for the development of mesophilic and thermophilic microflora cannot be independently controlled. It is also not possible to influence the microbial conversion of substances by means of a defined oxygen feed. The deficiencies of the current process controls are evident in the problem of establishing reproducible and specific conditions in the medium, for example in the formation of excessively high temperature plateaus in certain treatment phases, in an undesired dry stabilization of the rotting material and in an unsatisfactory conversion. The discharge of odoriferous substances and production condensate, which necessitate additional treatment means, are further aspects. Since the key parameters of the biological process control, the oxygen supply, the temperature and the moisture content, can be only inadequately maintained, no improvement in the rotting process is achieved even by connecting separate reactors to a central air preparation means, especially since the contents of the reactors exhibit different degrees of rotting and are supplied with identical air quality and quantity of air.

A basic aspect in the further development of the composting process is to improve the unsatisfactory and incorrect use of the potential performance of specific microflora, to remedy the inevitably poor reproducibility of desired qualities as defined by the quality guidelines for composts and/or to prevent the formation of pockets of harmful flora in composts and to prevent their secondary products and to improve the cost-efficiency of the rotting process by optimum process control. The risks of possible harmful effects in the diversified use of composts are otherwise incalculable and are unacceptable against the background of product liability.

DE-40 21 868 A1 - HERHOF - discloses a process for the composting of wastes. The material to be rotted is introduced into a closed container and microbially degraded with a supply of air. To start the composting rapidly and reliably, the waste air emerging from the rotting material is recycled to the rotting material during the initial phase. This air circulation phase is discontinued as soon as the oxygen content falls below 18%. The air circulation system described in this publication serves for conserving the biogenically formed heat, especially in winter.

DE-40 21 865 A1 - BERHOF - likewise describes a process and an apparatus for composting wastes with air circulation. The air circulation serves for maintaining hygienic conditions over a period of 5 days. It is started only after the degradation of the readily degradable components because the biogenic heat formation in the vigorous initial phase of the treatment then cannot be controlled by the system described if it is used for regulating the gas balance. Cooling can be achieved only by means of the fresh air supply as part of an undefined set of parameters.

Finally, DE-40 08 104 A1 - WIENECKE - describes a composting system which is suitable only for small containers since the aeration employs only convection. Control of microbial conversion is not possible.

In the case of these composting plants which have already been realized in practice (DE 40 21 868 A1; DE 40 21 865 A1; DE 40 08 104 A1), the air circulations described are those which are conceptually derived from process engineering which operates only with fresh air and which (from a lack of knowledge) does not utilize the possibilities offered by predetermined climatic conditions. Thus, importance is preferably attached to optimum oxygen supply (21%) in the gas phase, which supply can be achieved with a relatively low air throughput per unit volume and unit time. Frequently, the process relies on the carbon dioxide concentration as a control parameter, which is nonsense in the case of rotting mixtures whose pH is above 7. The attempt to achieve temperature plateaus which are as high as possible rules out the desire to regulate the temperature in the rotting mass to the biologically required conditions for desired conversions as an indispensable condition. However, where this route is adopted, it is found that the air throughput rates are set much too low to create homogeneous conditions in the substrate.

The composting plant stated at the outset is disclosed in DE 40 34 400 A1 or the corresponding WO 92/07807 - GRABBE. In order to avoid repetitions, this document is hereby incorporated by reference. It describes a process for the biotechnological treatment of a mixture of residues, preferably in the form of a clamp, by a microbial conversion process in a closed system which is suitable in particular for the production of compost. Here, physical, chemical and biological process parameters are included in the process control and together tailored to the microbial conversion required for this purpose in each case, with optimization of the hygienization, odor elimination and continuous humus formation of the mixture of residues. For this purpose, the mixture of residues is subjected to two different aeration methods or a mixed form of these two aeration methods. In one aeration method, air is passed through the mixture of residue. In the second aeration method, on the other hand, the air is passed along above the mixture of residues. In order to establish desired temperature conditions, humidity conditions and/or oxygen/carbon dioxide ratios, in particular profiles, in the mixture of residues, the two aeration methods are adapted to one another in such a way that variable mixing ratios between 0 and 100% can be generated from the circulated air volume flow rate. The means for aeration are in each case fans, one fan passing the air along above the mixture of residues and a second fan blowing the air through the mixture of residues.

The process described in the last-mentioned publications (DE 40 34 400 A1, WO 92 07807) usually operates successfully. However, problems may occur when the density of the mixture being rotted hinders flow through the mixture. In the limiting case where the mixture being rotted is impermeable to air, the fan provided for ensuring flow through the mixture merely builds up a static pressure under the clamp without it being possible to cause the air to flow, not even when both fans are running, i.e. the fan provided for ensuring flow over the clamp supports the fan provided for ensuring flow through the clamp, in that the air passing along the top of the clamp has a certain suction action on the clamp. Although both fans are running, only the air flowing over the clamp causes a certain air circulation in the system.

Further patent applications of the applicant (German patent applications with application numbers P 42 15 269.0-41 and P 42 15 267.4 and PCT applications with the application numbers PCT/EP93/01142 and PCT/EP93/01143), which have not yet been laid open, describe variable air circulation systems in closed rotting means for compost production, which eliminate the obvious disadvantages of the conventional systems. They additionally have the advantage that the relevant process parameters can be controlled independently of one another and can be combined in a suitable manner for optimizing the process control. In contrast, these parameters mutually influence each other in the conventional systems and hinder the biological process. The disclosure content of the above patent applications is hereby expressly also declared to be part of the description of the present application.

SUMMARY OF THE INVENTION

The object of the present invention is to provide a process and an apparatus of the generic type stated at the outset, which process or which apparatus permits a biologically sensitive regulation of desired modes of operation, in particular for the production of reproducible products in an economical manner.

The object according to the invention may be achieved by a process and an apparatus for the biological treatment, in particular composting, of biogenic and abiogenic substances and/or mixture of substances in a compost pile in the presence of biologically active components, in particular microorganisms, in a closed reactor having a plurality of reactor zones, namely the compost pile itself and at least one reactor gas space adjacent to the compost pile. According to the process, media states, changes in media states and/or process parameters in the compost pile are adjusted, maintained, controlled or regulated (referred to together below as regulated) by means of steady-state, quasi-steady-state and/or non-steady-state operation of the reactor. For this purpose, the apparatus possesses a closed reactor having the abovementioned reactor zones; furthermore, means for adjusting, maintaining, controlling and regulating (referred to together below as regulating means) the media states, changes in media states and/or process parameters in the compost pile by means of steady-state, quasi-steady-state and/or non-steady-state operation of the reactor.

By means of these measures, desired and required media states can be maintained by fine coordination of the transfer of climatic conditions from the gas space to the solids mixture, and the general microbial conversion can thus be influenced; furthermore, the performances and synergistic effects of specially promoted populations can be optimized.

These measures also permit an optimum adaptation of the process control to different starting points and rotting layer thicknesses.

According to one aspect of the invention at least two reactor zones, in particular the compost pile itself and a reactor zone adjacent to it, are preferably coupled to one another by means of gas flows, in particular air flows. This achieves, inter alia, the following advantages: if the mixture blocks the flow in a case of high density, i.e. if throughflow is blocked, it is possible, by coupling the flows of the reactor zones present above and below the compost pile, nevertheless to realize a wide range of flow variants, by means of which the media state in the compost pile can be influenced. Thus, at least the boundary layers between the compost pile and the gas spaces can be climatically conditioned; if required, the blockage can also finally be eliminated again thereby.

According to another aspect of the invention, the reactor operation is regulated by appropriate design of the regulating means, via one or more steady-state, quasisteady-state and/or non-steady-state gas flows. This makes it possible to avoid extreme media states at the interfaces of the compost pile, for example drying out, and furthermore to relativize temperature fluctuations or changes in the gas balance.

According to a further aspect of the invention, the regulating means are designed in such a way that they can be used to select at least one or more gas flows from the following gas flow types: flow through, flow over, flow under and flow around the compost pile. Here too, the development of extreme states during the composting process can be effectively counteracted in good time. So-called "seizing up" of the compost pile is thus prevented in practice.

According to yet another aspect of the invention, at least two different types of gas flow are combined with one another and in particular the volume, pressure, temperature and/or velocity conditions of the gas flow types are continuously regulated by the regulating means. The volumes, pressures and/or velocities of the gas flow types can be adjusted—likewise continuously—between 0 and 100%. The generation of desired gradients of the media parameters, e.g. $O_2$, $CO_2$, humidity and temperature, can be selectively and sensitively influenced in particular by the continuous change and combination of different gas flow types. Thus, the convection can be promoted or counteracted, for example by finely adjusted mixed forms of flow through and flow over or under. It is also possible to control the form of heat transfer from the compost pile. It is possible to choose between the convections and line-related mechanisms and thus to determine the degree of coupling of heat withdrawal to mass transport.

According to an additional aspect of the invention, the directions of flow of the gas flow types can be reversed at least once during the treatment, with the aid of the regulating means. These measures have the following advantage: by means of them, for example, undesired interfacial states can be compensated or destroyed, for example undesired drying out at the interfaces of the compost pile.

According to another aspect of the invention, the regulating means are designed for periodically alternating or aperiodically alternating reversal of the direction of flow of the gas flow types. In certain cases, quasisteady-state or non-steady-state flow conditions can be generated both by the periodically alternating and by the aperiodically alternating reversals of the direction of flow. The establishment of quasi-steady-state conditions may depend on the period or on the frequency of change of the direction of flow. Very frequent changes of direction may lead to non-steady-state flow conditions when, owing to the high frequency, no uniformity in the flow can be established. Undesired interfacial states can also be eliminated or compensated by this control of the gas streams. By suitably changing the process data-determining parameters, it is possible to maintain narrow temperature and humidity ranges in the case of large layer thicknesses.

According to a further aspect of the invention, the regulating means permit laminar and/or turbulent gas flow types. This too makes it possible to avoid or eliminate undesired interfacial states. The intensity of convection or of mass transfers as well as heat transfers can also be influenced by this.

With the invention it may be possible to change in a periodically alternating or aperiodically alternating manner between laminar and turbulent flow using the regulating means. These measures furthermore increase the possibilities of counteracting the abovementioned undesired interfacial states by adaptation of the heat transfer coefficients.

The regulating means may have control valves and/or displaceable obstacles to flow, including so-called baffles, by means of which laminar gas flow can be converted into turbulent gas flow, for example by alternating change of the positions of the control valves. This too increases the diversity of the means by which undesired interfacial states can be counteracted. It must of course be borne in mind that the compost pile itself, including its surface structure, should be considered as an obstacle to flow, and eddies or turbulences may be generated in the interfacial region by the surface structure of the compost pile itself. The eddies regularly change the heat transfer coefficients locally, as well as the gas exchange—analogously to local eddies in otherwise laminar liquid flows.

Continuously controllable regulating means, in particular control valves and controllable fans, may be provided in regulation systems, by means of which the gas flows and the proportions of the gas flows can be continuously changed relative to one another. The following advantages can be achieved by these measures: controlled starting of the procedure for rotting masses having heterogeneous compositions.

The regulating means may be expanded for process-dependent manual, program-controlled and/or computer-assisted actuation of the regulating means, in particular of the fans and control valves. The following advantages can be achieved by these measures: controlled transfer from one treatment phase to the other, for example from the incubation phase to the hygienization phase.

The temperature of the reactor air and/or the temperature of the compost pile may be selected as controlled variables and controlled as a function of the process. For this purpose, the regulating means have temperature measuring means which, preferably in combination with setpoint adjusters, comparators and controllers, are designed for process-dependent control or regulation. This permits better integration of the biogenic heat generation, a poorly adjustable quantity, into the temperature control, for example by first regulating the reaction air until a predetermined temperature value is reached and then regulating the temperature in the compost pile. It should be taken into account that the temperature of the reactor air should serve as a controlled variable only as long as the compost pile releases no biogenic heat into the reactor air. Changeover from regulation of the temperature of the reactor air to regulation of the temperature of the compost pile is preferably effected well before this time. Frequently, this time can be predetermined well in advance and with sufficient accuracy by comparison of the temperatures of the reactor air and of the compost pile.

Temperature differences in the compost pile and/or the variables of state of the gas streams and/or of the waste air, for example the temperature, the humidity, the $O_2/CO_2$ ratio, the gas pressure, the flow velocity and/or the throughput volume, may be used as controlled variables. For this purpose, the regulating means have appropriate measuring means for determining the temperature differences and/or for determining the actual values of the variables of state of the gas streams and/or of the waste air. The initial values of the measuring means are then compared in comparators with the initial values of setpoint adjusters, and the result of the comparison, the so-called deviation, is fed to controllers. Their output values are then used for controlling or regulating the stated temperature differences and/or variables of state. This permits the controlled setting of media requirements of certain microorganisms or microorganism species (anaerobic, aerobic, gassing with an inert gas in the case of high $CO_2$ tolerance, etc.).

The gas streams in a closed air circulation system may be circulated with or without fresh air feed. By means of this too, the gas balance can be manipulated in a known manner.

The gas of gas streams may also be conditioned in conditioning means to achieve the desired variables of state.

A defined ratio of circulated air to fresh air may be established by a circulated air discharge corresponding to the fresh air feed, preferably via appropriate control valves.

Conditioning of the flowing gas is preferably effected by adjusting temperature, pressure and ingredients, for example the content of nitrogen, oxygen, carbon dioxide, ammonia and water, in order to protect $CO_2$-tolerant microflora from competitors, for example by increasing the $CO_2$ partial pressure.

The compost pile may be mechanically treated, in particular circulated, by means of a turn-over apparatus. This measure serves for loosening and hence easier flow through the compost pile, furthermore homogenization of the compost material and standardization of the media conditions in the compost pile, and finally for the destruction of microcompartments in the mixture, so that microorganisms and substrate are continuously remixed, thus permitting complete degradation and conversion.

The apparatus may have a plurality of separate reactors, and the air circulation system is designed as a central aeration means. Preferably, at least one or more, or particularly preferably all, reactors are assigned means which are designed for reactor-independent and individual controllability of the process parameters determining the microbial conversion. This makes it possible for the media conditions of a plurality of individual reactors to be regulated sensitively and independently of one another to match the respective state of rotting and the material to be rotted. For this purpose the individual reactors can alternatively be connected to the central aeration means, preferably via control valves. It is furthermore preferable to equip each reactor with its own controllable fresh air feed. This further increases the degree of independence of the individual reactors.

A reactor has one reactor zone each directly above and below the compost pile, and these reactor zones can be connected to one another via gas flow pipes and control valves arranged therein. This makes it possible to increase the diversity of the gas flow types and the combinations thereof, permitting sensitive regulation of the media conditions.

The gas flow pipes and control valves are arranged in groups, symmetrically with respect to the reactor. A particularly clearly laid-out design of the apparatus is thus achieved. At the same time, a simple possibility is created for alternatively reversing the directions of the gas flows.

The reactor zones located above and below the compost pile are connected to one another on both sides of the reactor, in each case via a gas flow pipe having a first control valve. This makes it particularly convenient to regulate not only the volumes but also the directions and types of gas flows.

An increase in diversity of regulation may be achieved by the fact that a second control valve is arranged in the gas flow pipe in each case on both sides of the first control valves; there are thus altogether three control valves in each of the gas flow pipes connecting the two reactor zones.

The apparatus may have at least one or two fans, each of which is connected, via a third control valve downstream of it, to a point of the gas flow pipe which is between the first and the second control valve. This permits further increase in the diversity of regulation with regard to the gas flow types and their directions and combinations. Furthermore, each fan can be switched on to support the other. In principle, however, virtually all combinations of gas flow types can also be established by means of a single fan.

The gas flow pipe which connects together those ends of the reactor zones above and below the compost pile which face away from the fans may have a branch, located between its first and second control valves, for the air circulation line. The air circulation loop can be closed by means of this branch.

The air circulation line preferably has a fifth control valve, by means of which the flow cross-section of the air circulation line can be controlled, on the one hand to achieve through air circulation, but on the other hand to block the air circulation line and hence force complete flow around the compost pile.

The diversity of the gas flow variants is increased by branching the air circulation line into two further lines, namely a gas flow pipe entering the conditioning means and a further gas flow pipe entering the reactor. This makes it possible in particular to achieve turbulence effects, and to do so in accordance with the flow conditions. The diversity of said effects can be increased by further branching of the pipe entering the reactor space, in particular when a fourth control valve is arranged in each of the further branch lines.

Overall, the invention thus permits a flow variant in which only flow over the compost pile takes place, i.e. simultaneous flow through and around the compost pile is prevented. According to another variant, only throughflow can be established, i.e. flow over and flow around are prevented. Finally, the invention makes it possible to establish only flow around the compost pile, i.e. to prevent simultaneous flow over and through. Of course, some or all three of these flow variants may be simultaneously used.

The invention permits conversions under defined climatic and media conditions. Three different modes of operation can be established:
1. Steady-state mode—selected process without time—dependent effect on predetermined and/or desired variables of state.
2. Quasi-steady-state mode—alternate steady-state modes:
   - alternating aeration due to reversal of direction of flow,
   - any desired combination of the variants.
3. Non-steady-state mode—change of aeration before steady-state conditions occur:
   - straightforward reversal of the direction of flow
   - any desired combination of variants
   - change of conditions
   - permanent change of conditions by selected time interval.

The abovementioned modes make it possible to expose the compost pile alternatively to different flow variants. This provides an extremely flexible control system and process, with the aid of which the very different biological activities of mixtures of residues are controllable. Defined media conditions in the rotting material can be produced by means of the air circulation system, which transfers predetermined climatic conditions to the more solid mixture of substances, in particular by changing the flow parameters and flow control, including alternative flowing over and/or flowing under and/or flowing through and/or flowing around the compost pile.

The gas exchange in stationary solids mixtures may be based on free convection and on the throughflow of blown-in air. Neither one method nor the other alone permits fine adjustment to the requirements of microbial conversion. The variable combination of over-flow for influencing convection with through-flow by networked controllable air transport has never been realized to date. The process engineering possibilities made available are described briefly below:

Defined media conditions in the rotting material can be produced only if the air circulation system permits flow control which transfers the set climatic conditions to a solid mixture of residues, the density of which may differ. The air volume flow control must be sufficiently flexible and convenient that the very different biological activities of mixtures of residues remain controllable. This is achieved through changes in the flow parameters and flow control and in the conditioning of the flow medium (e.g. temperature, pressure, pH, moisture content, $O_2$ content, $CO_2$ content, removal of substances, such as ammonia). By the manual or programmed specification and/or computer-assisted modification of variable flow controls and flow velocities, it is possible to suppress undesired heat generation and hot spots or to remove excess heat from the system without other process-relevant parameters being permanently altered. This gives rise to advantages which may be described as follows:

The temperature plateaus for microflora involved in general (e.g. composting process) and specific metabolic processes (e.g. metabolite production in the pharmaceutical industry) can be controlled in a specific manner. The relationships and dependencies can best be demonstrated for the composting process. The hygienization can be optimally achieved thermally and biochemically at temperatures <60° C. Odoriferous substances are continuously recycled through the rotting material and thus degraded. In the course of the process, the conversion is optimized via regulated temperature profiles so that certain classes of substances are preferentially converted, synthesized and degraded. The oxygen supply can be regulated so that all states between strict anaerobic conditions and strict aerobic conditions can be continuously established via the gas phase in the air circulation system and a spread of temperature and media conditions in the solids mixture is avoided. This biological process control results in shorter residence times, which make it possible to operate closed rotting plants more economically.

In the design of its air circulation, a composting plant having a plurality of reactors has the advantage of firstly being able to carry out basic conditioning of the circulating air independently of the volume with fresh air feed. The latter serves for establishing the desired oxygen content. The process parameters of the connected rectors are finely adjusted, individually and independently of one another, to the process conditions individually desired in each reactor, taking into account the process conditions there.

The connected reactors may be operated, for example, as follows.

1. The connected reactors have a means for reconditioning via heating, cooling and humidification registers for the quantities of air which flow internally through the rotting material. At a corresponding air throughput, it is ensured that the climatic conditions in the space are identical to the climatic conditions in the mixture. The waste air is fed to the central air circulation and integrated again. Excess air is released via biofilters. In this procedure, the central air circulation may have a low oxygen content if semi-anaerobic or anaerobic media conditioning is required. Furthermore, the reactors have their own fresh air feed.

2. In addition to or instead of the reconditioning via heating, cooling and humidification registers, the connected reactors have their own air circulation system whose flow parameters are separately and individually adjustable. The desired climatic conditions in the reactor are established within a very short time and can be stabilized by means of air part-streams from the central air preparation. The desired oxygen feed can be effected via the circulation air fed in and/or separate fresh air feed. Corresponding amounts of waste air are integrated in the central air circulation. Excess amounts of air are released via a central biofilter.

3. Finally, the individual reactors can also be connected to one another, for example for heat exchange or utilization of the most advanced rotting stages as biofilter for the least converted rotting material, i.e. of the freshest compost pile, in particular after completion of the hygienization phase.

The basic preparation of the circulation air can be all the more readily tailored to the range of requirements of reactors with different rotted contents the more identical the composition of the particular starting mixture in the reactors. Here, it is important to adhere to developed formulations. The separate air circulation makes it possible to set flow parameters which direct the biological activities of the respective reactor mixture along the desired lines. This applies, for example, to the establishment of the temperature plateau during hygienization, to the elimination of temperature peaks, to the avoidance of hot spots or to the determination of temperature profiles. Internal air circulation also ensures that odoriferous substances are eliminated by means of the reactor's own rotting mixture acting as an internal biofilter. This relieves the central air circulation system and the external biofilter connected to it.

Further preferred features of the invention are evident from the description below of preferred exemplary embodiments. These embodiments are shown schematically in the attached drawings.

DESCRIPTION OF THE PREFERRED EMBODIMENTS

Figure 1:
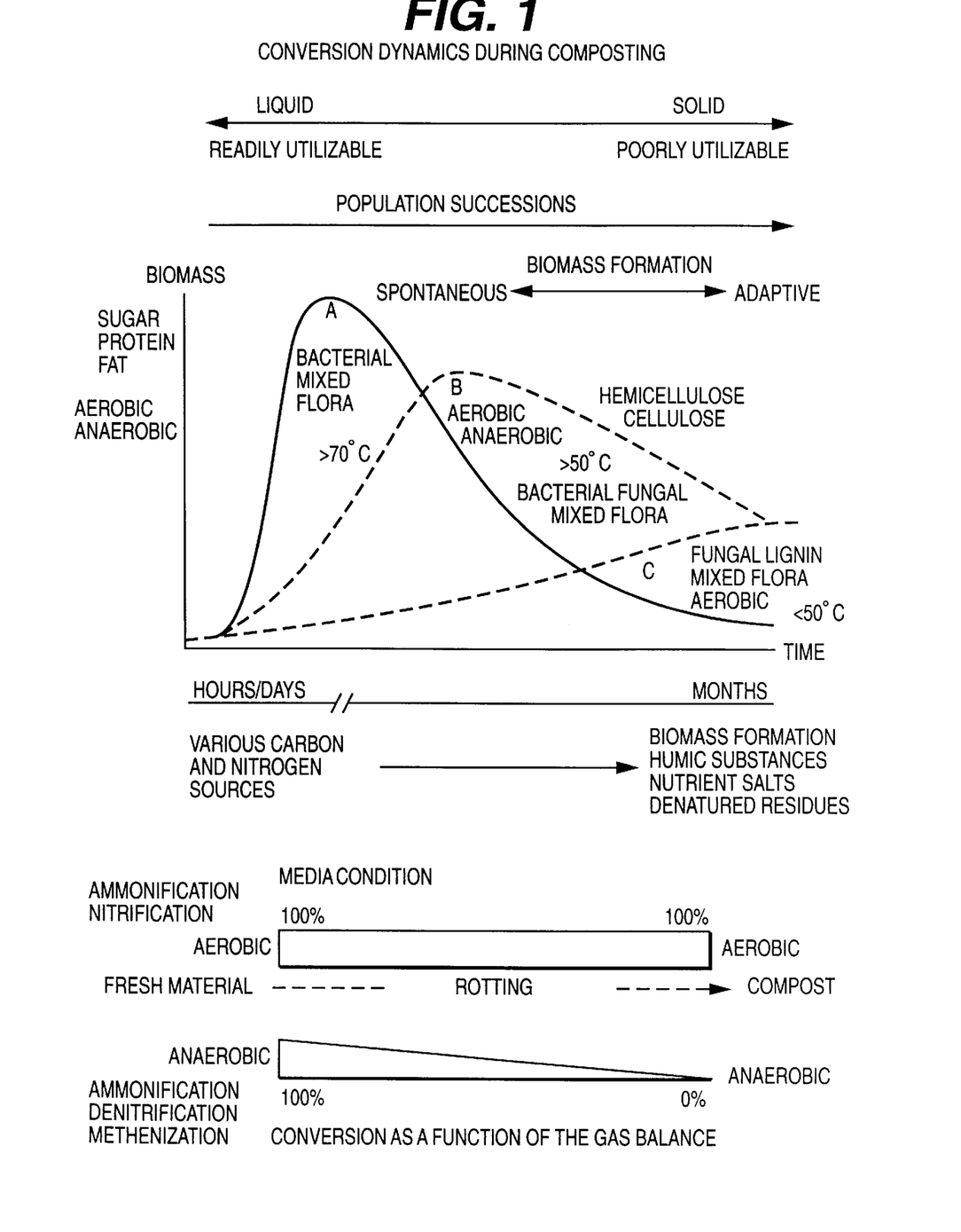
FIG. 1 shows the dynamics of conversion during composting.

FIG. 1 illustrates the known dynamic process which takes place during composting and involves biomass formation and conversion, as a function of time and of the respective microflora. The readily utilizable carbon compounds and nitrogen compounds are mineralized. Since this process takes place rapidly, temperatures of up to 80° C. occur. This phase of composting serves for hygienization and degradation of the odoriferous substances.

After the degradation of those classes of substances which can be preferentially degraded by the bacterial mixed flora, changes in the composition of the population occur. This now consists of bacteria and fungi, as shown in FIG. 1. The composting process then continues with the exclusively oxidative degradation of substances. In this phase, predominantly aerobic fungal flora slowly degrade the lignocellulose.

It is characteristic of the composting process that the conversion at the beginning can take place both under aerobic and under anaerobic conditions. This is the reason why deposited fresh material leads to the formation of fermentation gases. Composting, on the other hand, leads to a conversion which necessitates strictly aerobic conditions, as shown in FIG. 1. In this stage, the microbial conversion comes completely to a standstill if the oxygen supply is discontinued. This can easily be demonstrated. A plastic bag in which final or stable compost is packed airtight assumes the appearance of a vacuum-sealed peanut pack after some time. As a result of the oxygen consumption by the microflora, reduced pressure is generated in the plastic bag. If the stage of stable compost had not yet been reached—i.e. if anaerobic microflora might still have been active under the prevailing conditions—it is possible to demonstrate that the result would be gas formation ($N_2$ or $N_2O$, methane, foul-smelling gases). The sack would inflate.

During composting, permanent humus is formed with a reduction in volume (about 50% rotting loss), said humus being based on the following conversion. The oxidative degradation of the three-dimensionally networked lignin macromolecule takes place in fractions which are either completely mineralized or are repolymerized together with microbially formed auto-oxidizable phenols to give humic substances. This biologically induced and chemically catalyzed process is integrated in the dynamics of the conversion in such a way that the result is a compost whose organic substance exhibits increasing persistence against microbial degradation under the conversion conditions of the aquatic and terrestrial ecosystems.

The object of the invention is to give the particular desired microflora an advantage in terms of selection by selectively controlling the ambient parameters optimal for these flora, such as temperature, humidity and gas composition, and hence providing the microflora with an environment which is optimum for them.

In this application, the same reference symbols are used throughout for equivalent or functionally equivalent parts in all embodiments.

Figure 2A:
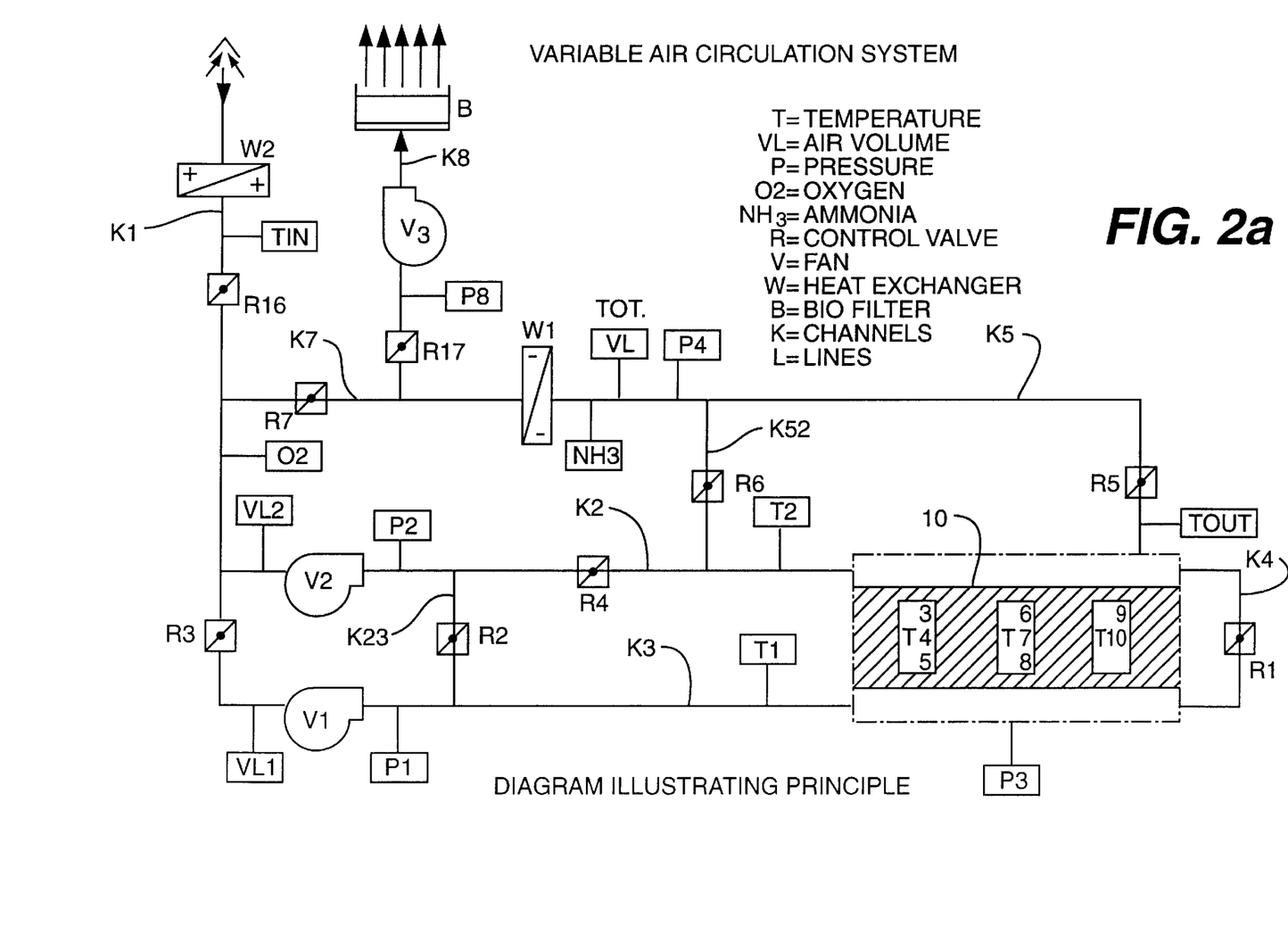
FIG. 2a shows a diagram of an air circulation system for closed reactors

FIG. 2a shows the diagram of a first embodiment for a composting plant according to the invention. There, circulated air can be fed via a heat exchanger W1 when control valve R5 is open. The heat recovery in the heat exchanger W1 is preferably used for heating, via a heat exchanger W2, fresh air which flows in via channel K1. The fresh air entry is controlled by means of a control valve R16 and fed, via two fans V1 and V2 connected in parallel, to a reactor space located above a compost pile 10 and one located below said compost pile. The compost pile 10 and the reactor gas spaces are also referred to below as reactor zones. The corresponding air discharge is effected, with control valve R17 open, via a fan V3 connected in series with the two fans V1 and V2. The air blown out is passed via a biofilter B.

The temperature sensor $T_{in}$ which measures the temperature of the air supplied is arranged in channel K1, behind the heat exchanger W2. The output data of said temperature sensor are fed to a process computer (not shown) for electronic control of the composting process.

A sensor $O_2$ for determining the $O_2$ content is arranged below the control valve R16 in channel K1. The output values of this sensor too are fed to the process computer. The channel K1 branches into a channel K2 in which the fan V2 is arranged. A sensor VL2 which measures the air volume is arranged upstream of the fan V2. The output value of said sensor is in turn fed to the process computer. A further sensor P2 which measures the flow pressure is downstream of the fan V2. The channel K2 enters the reactor zone above the compost pile 10. Said channel contains a control valve R4 which is downstream of the fan V2 and can be controlled by the process computer. The fan V2, too, can be controlled by the process computer. A further temperature sensor T2 whose output signal is in turn fed to the process computer is arranged directly before the entry of the channel K2 into the gas space above the compost pile 10.

The upper reactor zone connects to a channel K5 which is equipped with a temperature sensor Tab. Its measured values are in turn fed to the process computer. The free flow cross-section of the channel K5 is controlled by the control valve R5. The channel K5 is finally led via the heat exchanger W1 to a branching point from which the channels K7 and K8 emanate. The channel K7 is led back to the channel 1 via a control valve R7 controllable by the process computer. The free flow cross-section of the channel K8 is set by a further control valve R17. A pressure sensor P8 is downstream of the control valve R17 and upstream of the fan V3. The fan V3 blows the waste air via the biofilter B into the atmosphere.

A further pressure sensor P4, an air volume sensor $VL_{tot}$ and an $NH_3$ sensor $NH_3$ are located directly upstream of the heat exchanger W1. The output values of these sensors are likewise fed to the process computer.

Before the last-mentioned sensors, a channel K52, which is connected via a control valve R5 to the above-mentioned channel K2, branches from the channel K5.

The channel K1 is continued beyond its branch line leading to the fan V2, namely continued to the fan V1. A control valve R3—once again controllable by the process computer—is located between the fans V2 and V1, in the channel K1. Directly upstream of the fan V1, an air volume sensor VL1 measures the air volume flowing to the fan V1. The fan V1 blows air via the channel K3 into the reactor gas space below the compost pile 10. A pressure sensor P1 is in turn located downstream of the fan V1, and upstream of a branch line K23 which connects the channel K2 to the channel K3 via a control valve R2. A temperature sensor T1 is also arranged directly before the entrance of the channel K3 into the reactor zone below the compost pile 10.

A pressure sensor P3 measures the pressure in the gas space below the compost pile 10. The gas spaces below and above the compost pile 10 are connected to one another via a channel K4. The control valve R1 controls the free flow cross-section in the channel K4.

Finally, the plurality of temperature sensors T3, T4, T5, T6, T7, T8, T9 and T10 are also arranged in the compost pile 10.

Figure 4A:
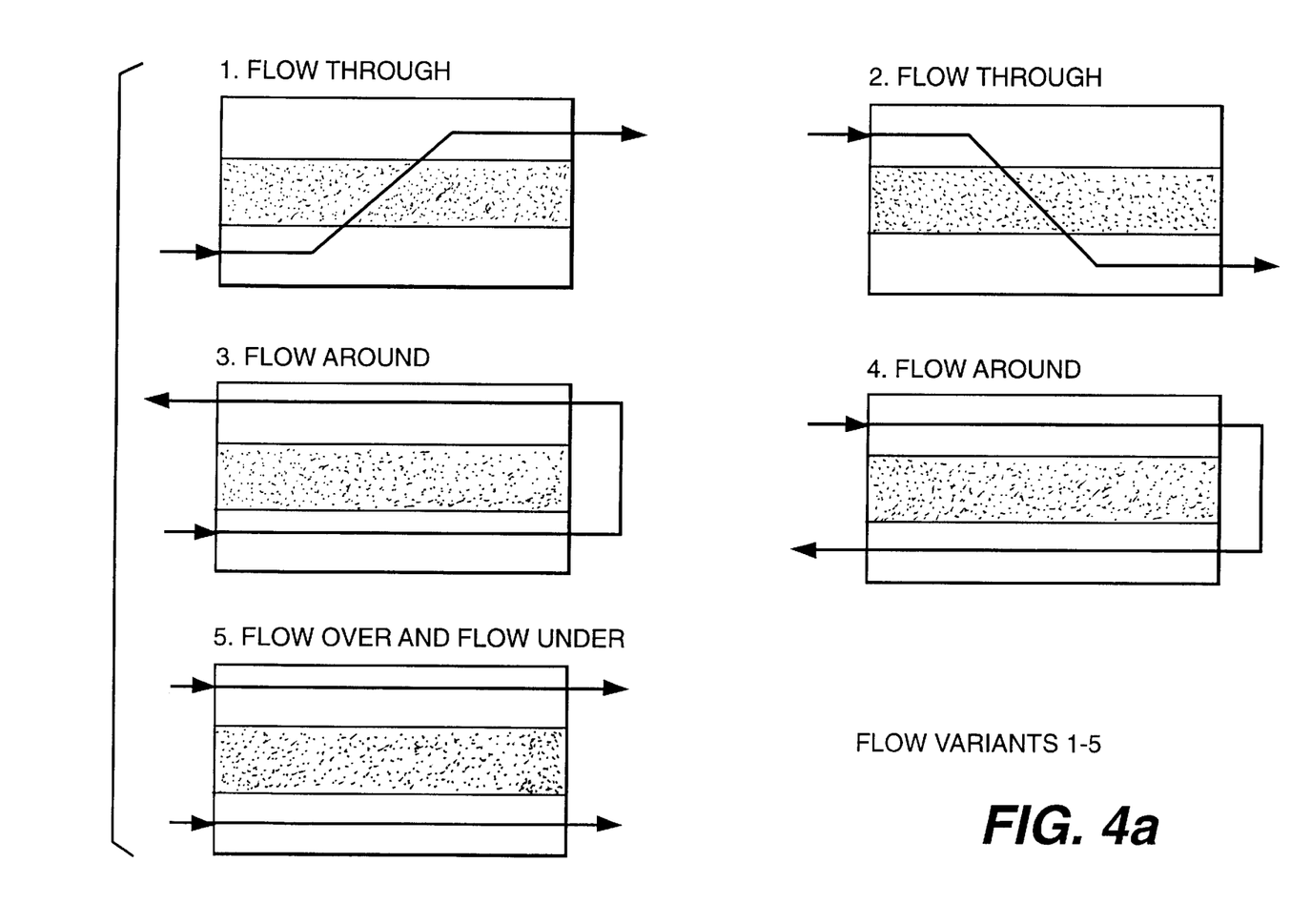
Figure 4B:
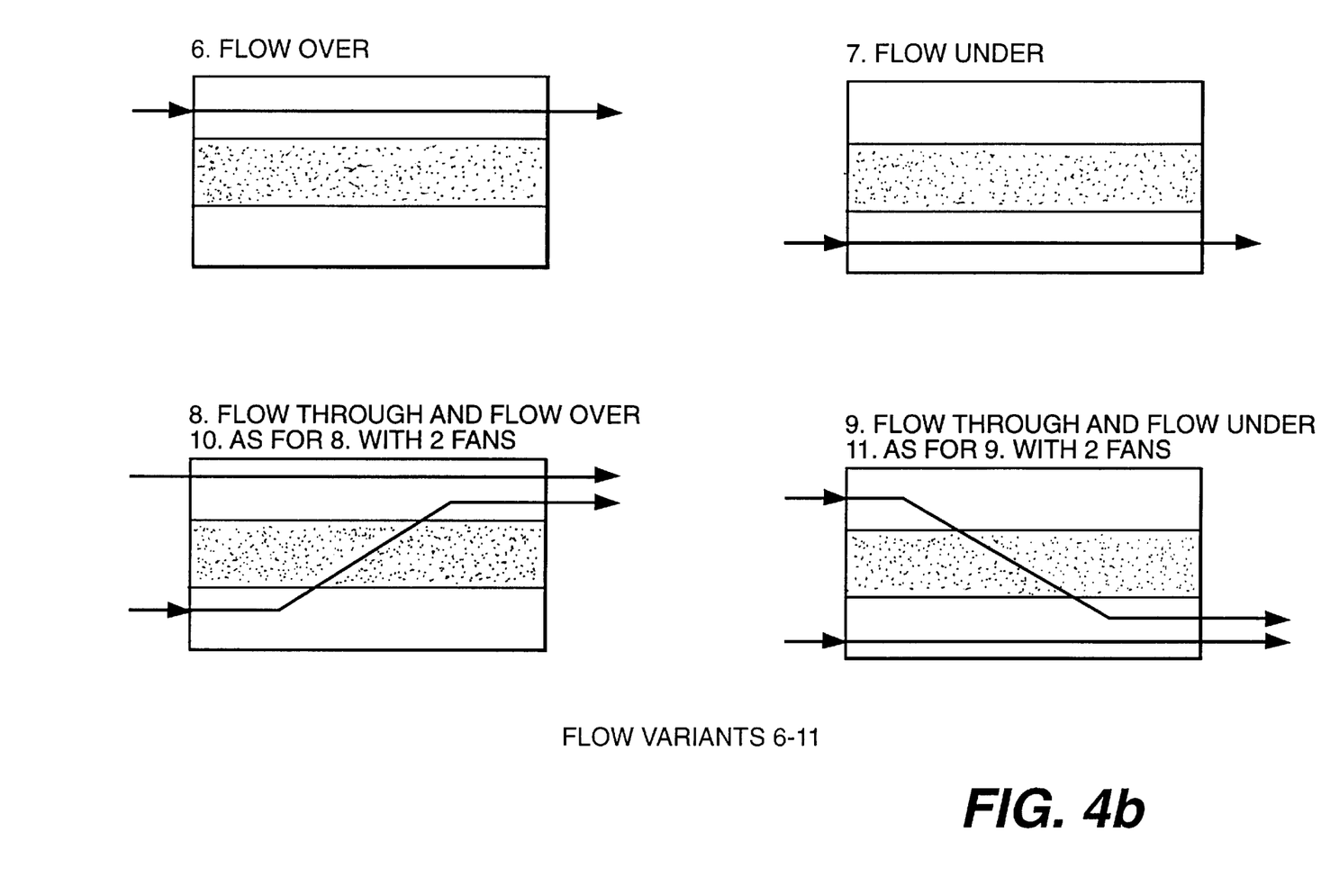

The control value R1, in conjunction with the other control valves, permits in particular the gas, especially air, flow variants shown in FIG. 4a and 4b under Examples 1, 3, 5, 6 and 8. In the embodiment shown, the control valves are controlled by the process computer, and the output data of all measuring instruments are fed to the process computer. The powers of the 3 fans, V1, V2 and V3 are also controlled by the process computer.

The embodiment shown illustrates the immense diversity of the flow variants which can be achieved by means of it and with the aid of only two fans and the stated control valves. It is only the diversity of the flow variants which permits the exact and sensitive tailoring of the process parameters to the particular desired microbial conversion, i.e. the adaptation of the process parameters for the particular desired microflora. Only in this way is it possible to exert a biologically effective influence on conversion.

In general, an air circulation system for closed rotting systems is described, in which the flow parameters and the flow can be sensitively adapted to the purposes of a defined biochemical process. By means of this adaptation, the process can be carried out in a variable manner. Flow may be over, through or around stationary or thoroughly mixed compost pile. All combinations of these flow variants are also possible. In general, the microbial conversion can be sensitively controlled and regulated by maintaining desired climatic and media conditions.

To be able to combine the power of the two fans V1, V2, linking the under-flow with the over-flow through the channel K4 with built-in control valve R1 is a solution which has considerable advantages over the prior art. It is used in particular for the flow variants shown under 1, 3, 5 and 8 in FIG. 4a to 4b.

In comparison, the document stated at the outset GRABBE (WO 92/07807) describes a relatively simple channel arrangement with restriction of the gas flow variants. Integration of the fan powers and gas flows is possible only by means of integration of the channels with the appropriate control valves. The control valve R1 which is continuously adjustable manually or by means of a computer is of considerable importance. Fine adjustments in carrying out the biochemical process thus become possible in a quality unknown to date.

Figure 2B:
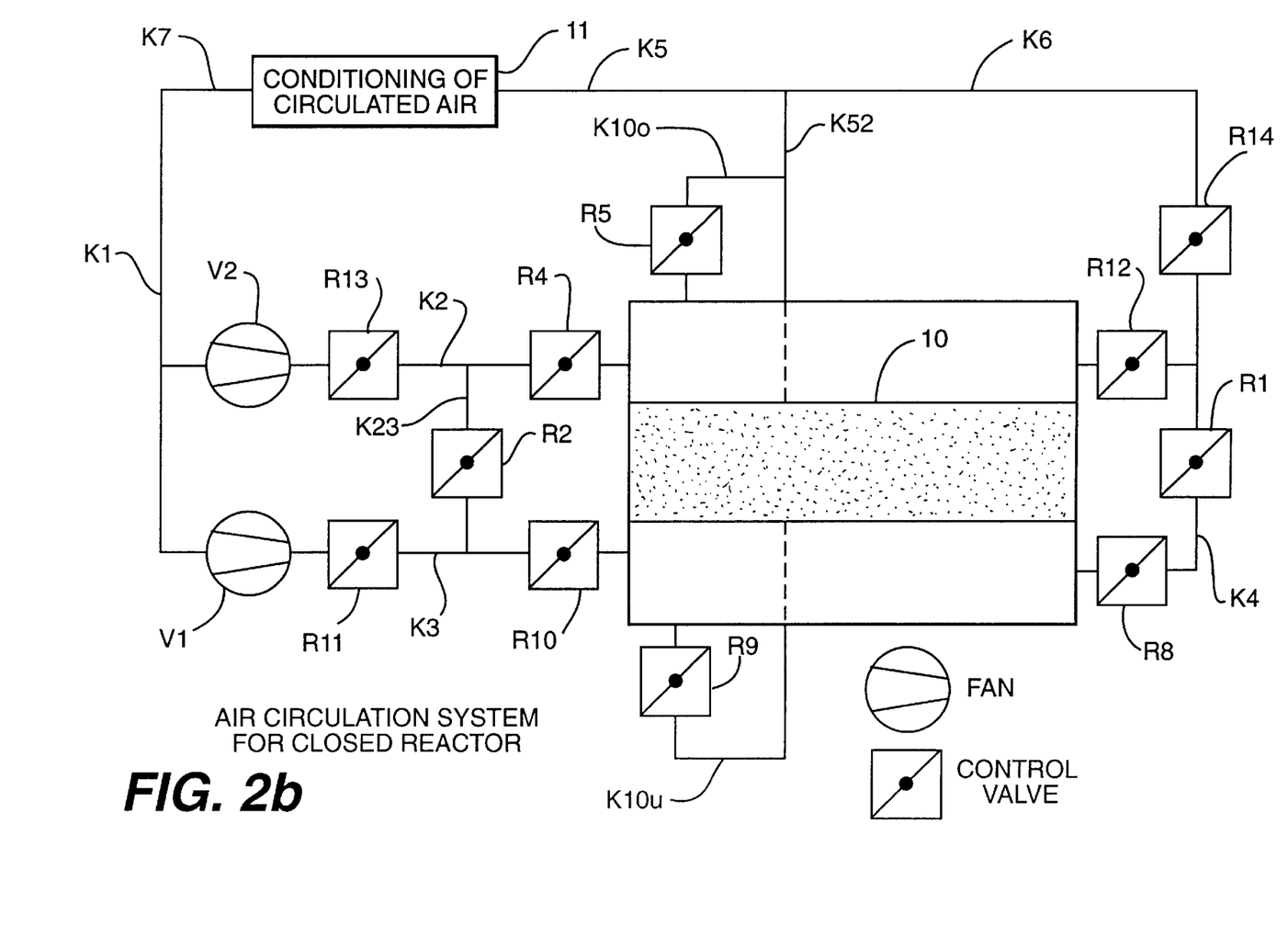
FIG. 2b shows a further diagram of an air circulation system for closed reactors

FIG. 2b shows a diagram of a further embodiment of the invention. This embodiment adopts the fans V1 and V2, the control valves R1, R2, R4 and R5, the channels K1, K2, K3, K4 and K5 and reactor zones of the preceding embodiment (cf. FIG. 2a). However, it supplements these by the control valves R8, R9, R10, R11, R12 and R14, the channels K6 and K10 and the circulated air conditioning means 11. The exact arrangement of the abovementioned elements is shown in FIG. 2b, to which reference is hereby expressly made. According to this figure, any desired combination of the following gas flow types can be selected in the aeration system for closed reactors: flow through, over, under and around the compost pile 10. This is achieved through alternative combination of the control valves to give different control systems having at least one running fan. The alternative combination of control valves R1, R2, R4, R5, R8, R9, R10, R11, R12, R13 and R14 shown in FIG. 2b permits the establishment or continuous regulation of the flow variants. In particular, the flow variants shown in FIG. 4a to 4c under Examples 1–15 (without the flow variants 10, 11, 14 and 15) and having only one fan and one control system may be described.

Figure 3A:
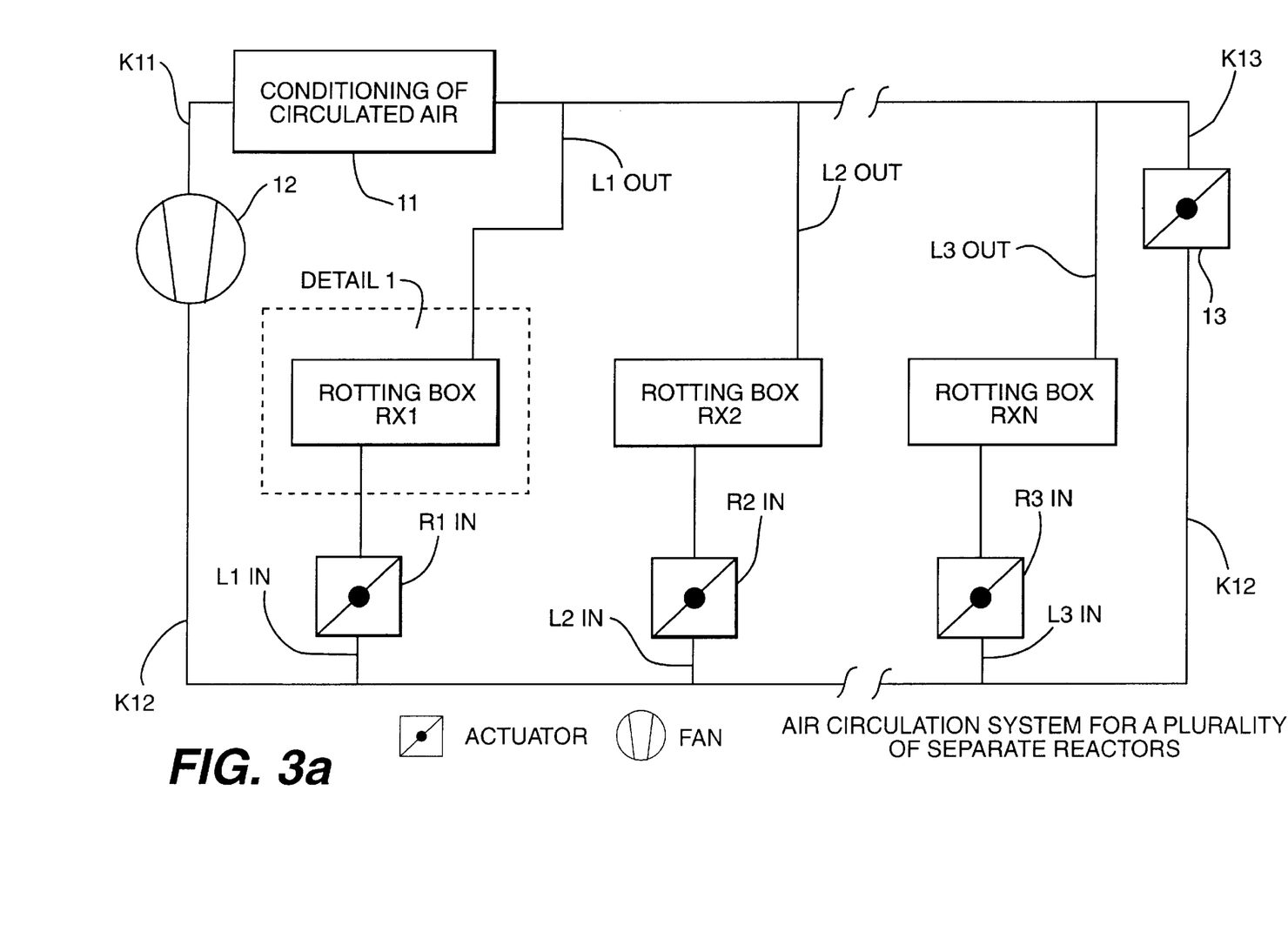
FIG. 3a shows a diagram of an air circulation system for a plurality of separate reactors

FIG. 3a shows a diagram of a further embodiment of the invention. In this, the air circulation system (cf. FIG. 2a and 2b) not only can be used for a single reactor for conditioning the circulated air but permits the conditioning of the circulated air of a plurality of separate reactors, also referred to as rotting boxes RX1, RX2, . . . RXN. This is achieved by coupling the air supplies of the individual reactors to central aeration means 11, 12, 13 via control valves $R1_{in}$ to $RN2_{in}$ on the reactor. The control valve $R1_{in}$ is continuously coordinated with the rotting box RX1, the control valve $R2_{in}$ continuously with the rotting box RX2, etc.

According to FIG. 3a, the composting plant has a plurality of separate reactors, rotting boxes RX1, RX2, RXN, each of which is connected via supply lines and discharge lines $L1_{in}$, $L1_{out}$, $L2_{in}$, $L2_{out}$, $LN_{in}$, $LN_{out}$ to the central aeration means 11, 12, 13. The central aeration means has a circulated air conditioning means 11 which is connected to a main fan 12 via a. channel K11. The main fan 12 is connected to a controllable main control valve 13 via a channel K12. Finally, the main control valve 13 is in turn connected to the circulated air conditioning means 11 via a channel K13. The circulated air conditioning means 11, the main fan 12 and the main control valve 13 are connected in series. Together, with the channels K11 to K13, these means form an air circulation loop.

The lines $L1_{in}$ to $LN_{in}$ branch off from the channel K12 and lead to the respective rotting boxes RX1, RX2, RXN. The lines $L1_{out}$ to $LN_{out}$ connect the rotting boxes RX1, RX2, RXN to the channel K13. Each of the lines $L1_{in}$ to $LN_{in}$ contains a controllable control valve $R1_{in}$, $R2_{in}$ or $R3_{in}$, respectively. Thus, the circulated air conditioning means 11, the channel K11, the main fan 12, the channel K12 and each of the supply lines and discharge lines $L1_{out}$ to $LN_{out}$, together with the rotting box, also form a branch loop.

Figure 3B:
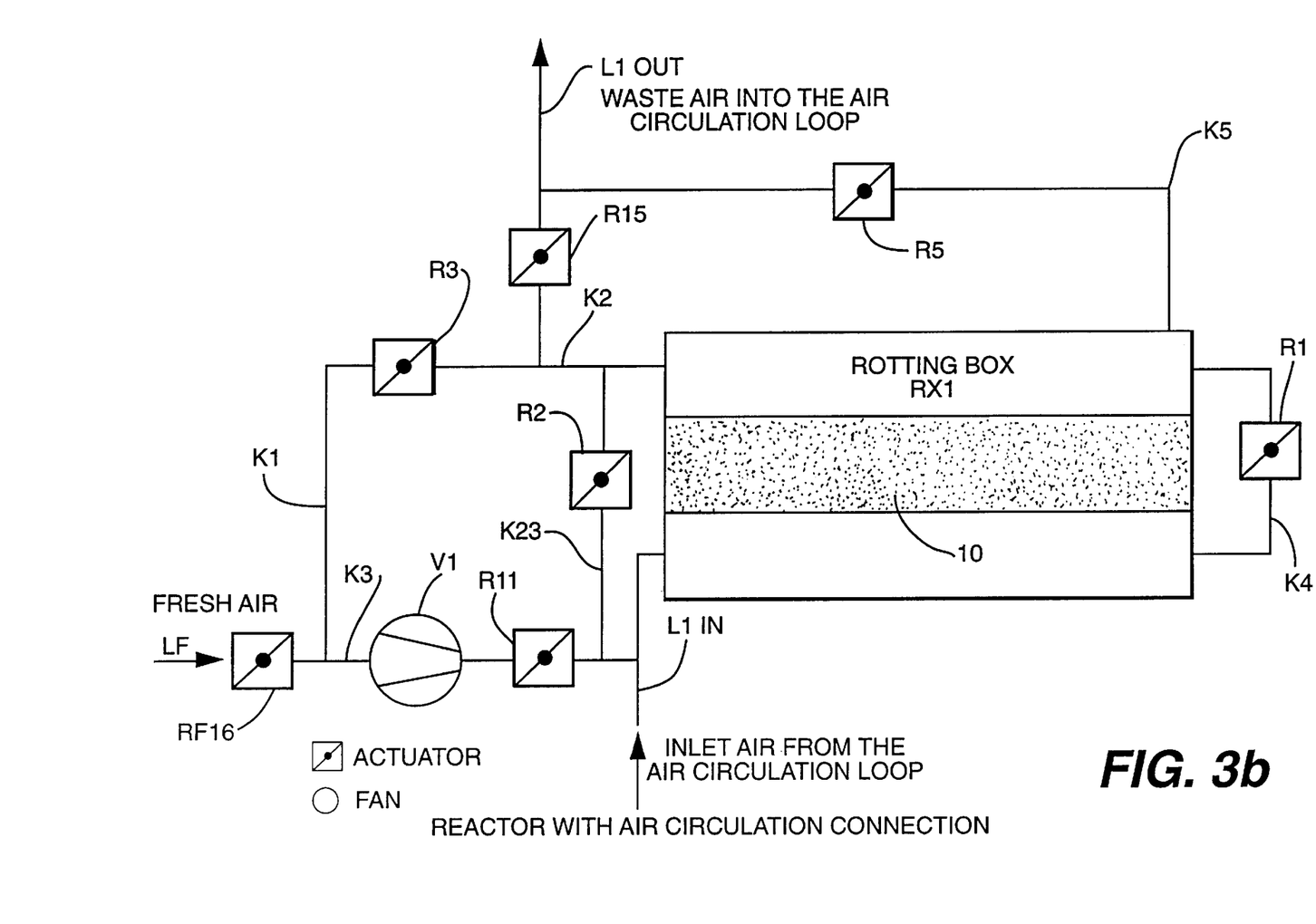
FIG. 3b shows a detail of an individual reactor having an air circulation connection according to FIG. 3a FIGS. 4a to 4c show different air flow types and variants.

FIG. 3b shows a flow diagram of a single reactor of the embodiment of the invention according to FIG. 3a. According to this, each single reactor has its own controllable fresh air supply LF, RF16 and at least one fan, by means of which a reactor-specific air circulation and air circulation control of the air flow variants and coupling of the running system to the air circulation system via the air circulation connecting lines $L1_{in}$, $L1_{out}$) and control valves R15, R7 can be controlled.

The rotting box RX1 having an individual air flow system is shown as a typical example of all single reactors. The compost pile in rotting box 1 once again has reference symbol 10.

The individual air circulation system for the rotting box RX1 has the fresh air supply line LF, which supplies fresh air via a control valve RF16. After the control valve RF16, the line LF divides into a branch line K3 having an integral fan V1 and downstream control valve R11. The line K3 leads into the supply line $L1_{in}$, which enters the rotting box RX1 below the compost pile 10. The line K4 connects the gas spaces below and above the compost pile 10 via the control valve R1, and does so at that end of the rotting box RX1 which is opposite the supply line $L1_{in}$. At that end of the rotting box RX1 which is opposite the line K4, i.e. at the same end into which the supply line $L1_{in}$ leads, the line K2 leads from the gas space above the compost pile 10 out of the rotting box RX1. This line K2 is returned via the further controllable valve R3 and the line K1 to the line K3, at a point between the control valve RF16 and the fan V1. The connections just described constitute a first air circulation loop for the rotting box RX1.

Between the rotting box RX1 and the control valve R3, the line K2 branches into the line $L1_{out}$, and does so via the further control valve R15. In addition, the lines K3 and K2 are connected to one another via a further control valve R2 and a line K23, said connection being effected directly upstream of the rotting box RX1. The line K5 connects the reactor zone above the compost pile 10 to the waste air line $L1_{out}$ via the control valve R5. The line K5 emerges from that end of the rotting box RX1 which is directly adjacent to the line K4. It connects with the line $L1_{out}$ downstream of the control valve R15.

This type of air flow permits, alternatively, flow over, flow under, flow around and/or flow through the compost pile 10, and does so in principle in the same manner as in the embodiments of FIG. 2a and 2b.

Figure 4C:
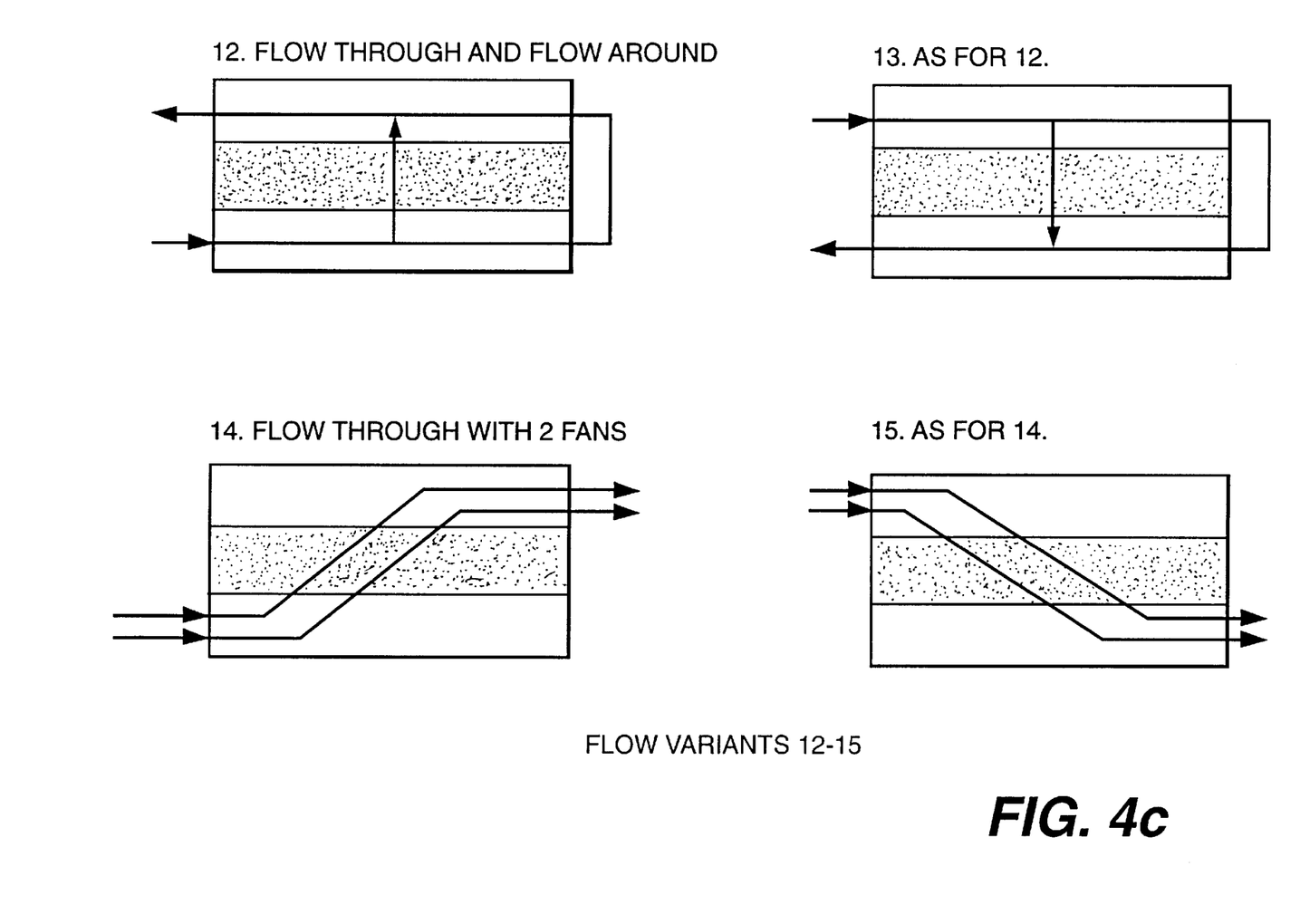
Figure 5:
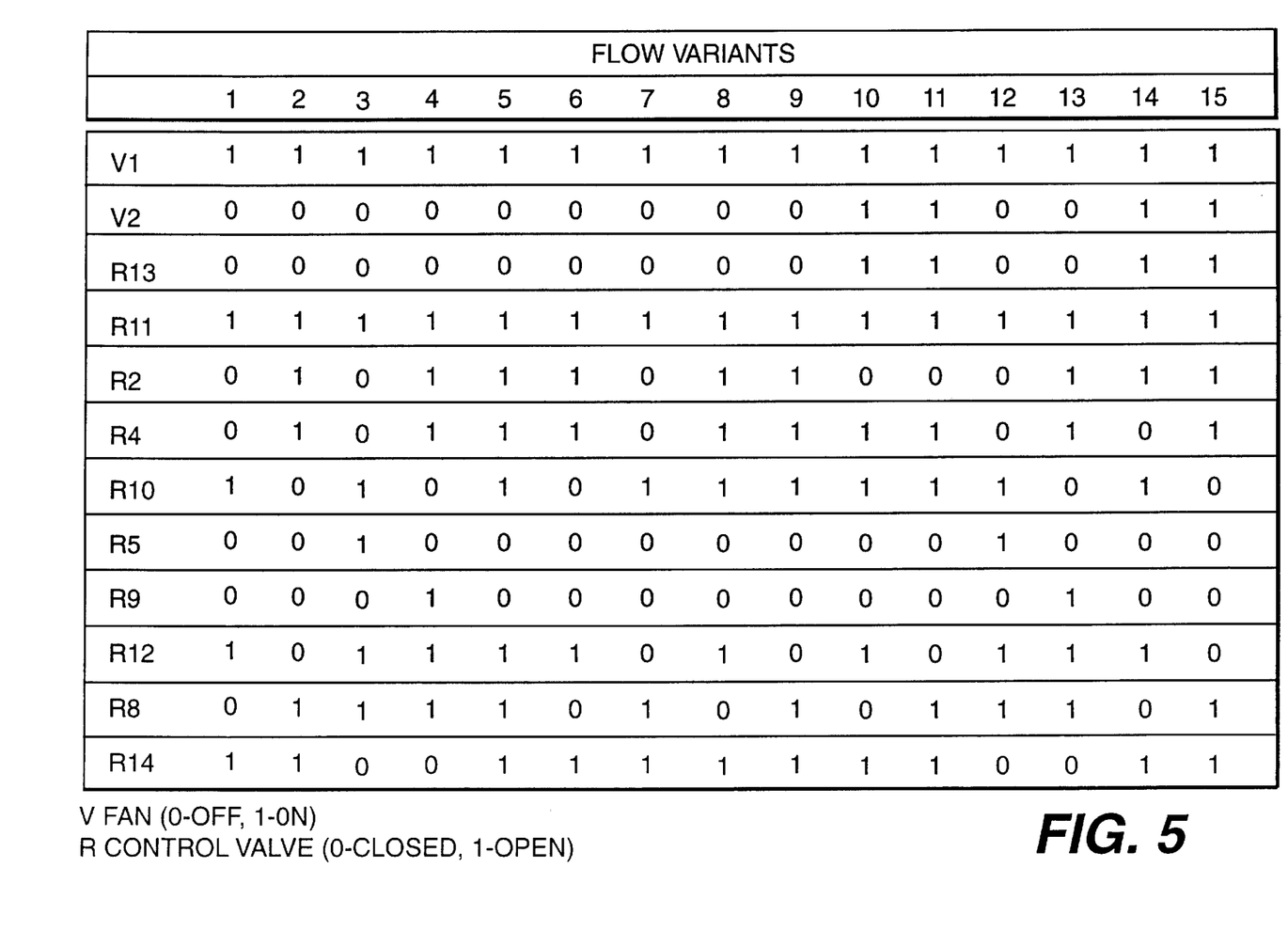
FIG. 5 shows a control table for controlling the control valves and fans, shown in FIGS. 2a to 3b, for establishing the air flow types and variants shown in FIGS. 4a to 4c.

FIG. 4a to 4c show the various air flow types and variants according to the invention, the respective associated position of the valves and the switching state of the fans being shown in FIG. 5:

Examples 1.)/2) Flow through the compost pile 10 from bottom to top or from top to bottom.

In the case of flow through from bottom to top (Example 1, FIG. 4a), the fan V2 is switched off and the control valves R2, R4, R5, R8, R9 and R13 are closed. The control valves R10, R11, R12 and R14 are opened. For reinforcement, the fan V2 (for example of lower power) can be switched on in series and the control valves R2 and R13 can be opened. The position of the control valves and fans in Example 2 in FIG. 4a are indicated in FIG. 5.

Examples 3.)/4.) Flow around the compost pile 10 from bottom to top or from top to bottom.

In the case of flow around from bottom to top (Example 3, FIG. 4a), only the fan V1 runs and the control valves R5, R8, R10, R11 and R12 are open; the control valves R2, R4, R9, R13 and R14 on the other hand are closed (cf. FIG. 5).

If required, the fan V2 may also be switched on and the control valves R2 and R13 may be opened. The fan V2 also switched on then serves to increase the amounts of air delivered in the various air flow variants. The position of the control valves and fans in Example 4 in FIG. 4a is likewise shown in Fig.5.

Example 5.) Flow over and flow under the compost pile 10.

In the case of flow over and flow under the compost pile 10 (Example 5, FIG. 4a), either both fans V1 + V2 operate in parallel or V2 is switched off. If only the fan V1 is used, the control valves R2, R4, R8, R10, R11, R12 and R14 are open and the control valves R5, R9 and R13 are closed. In this flow variant, the compost pile 10 is exposed on both sides (top and bottom) to the same effect as in the variant according to Example 6, FIG. 4b, i.e. straightforward overflow acting only on one side.

Examples 6.)/7.) Flow over or flow under compost pile 10.

For the purpose of over-flow (Example 6, FIG. 4b), the air is passed over the compost pile 10. In this case, either fan V1 or V2 operates. If fan V2 operates, the control valves R1 and R2 are closed; the control valves R4, R12 and R14 on the other hand are open. Laminar airflow removes heat and waste gases very gently. It also leads to gentle suction of the gases out of the compost pile 10 and into the air flowing over. The position of the control valves and fans in Example 7 in FIG. 1 are indicated in FIG. 5.

Examples 8.)/9.) Flow through from bottom to top and flow over or flow through from top to bottom and flow under.

In order to combine flow over with flow through (Example 8, FIG. 4b), the fan V1 operates and the control valves R2, R4, R10, R11, R12 and R14 are open (cf. FIG. 5). The valves R5, R8, R9 and R13 are closed. The advantages of this flow variant are described in detail in DE 40 34 400 A1 or the corresponding WO92/07807 - GRABBE. To avoid repetitions, the content of the stated document is expressly referred to here. The position of the control valves and fans in Example 9 in FIG. 4a are indicated in Fig. 5.

Examples 10.)/11.) are the same as Examples 8.)/9.), but with at least two fans.

Here too, reference is made to FIG. 5.

Examples 12.)/13.) Flow around from bottom to top and simultaneous flow through from bottom to top or flow around from top to bottom and simultaneous flow through from top to bottom.

In this flow variant, the regulation of the valves R8 and/or R1 (cf. FIG. 2b) and of the valves R12 and/or R1 in conjunction with R14 permits continuous change from pure flow through to a mixed form between flow through and flow around. Furthermore, it is possible to change continuously between the flow forms of Examples 12 and 13 by additional regulation of the valves R2, R10 and R4. This change of flow corresponds to flow reversal (cf. FIG. 5, flow variants 12 and 13).

Examples 14.)/15.) are the same as Examples 1.)/2.), but with at least two fans.

By controlling the valve position and/or by introducing obstacles to flow, it is possible to adjust the proportions of laminar and/or turbulent flow in all modes of flow operation and hence to have a distinctive and selective effect on the upper and lower surfaces of the compost pile (10).

What is claimed is:

1. An apparatus for the treatment of substances or mixtures of substances in a compost pile using biologically active components, the apparatus comprising:
   a) a closed reactor having a plurality of reactor zones, including a compost pile zone and reactor gas spaces adjacent to the compost pile zone; and
   b) gas flow regulating means for adjusting, maintaining, controlling or regulating compost pile media states, changes in compost pile media states and/or process parameters in the compost pile, said gas flow regulating means being configured to permit selective adjustment between gas flows through, over, under and/or around the compost pile as well as reversal of direction of abovementioned gas flows.

2. The apparatus as claimed in claim 1, wherein the gas flow regulating means manipulates air flow.

3. The apparatus as claimed in claim 1 or 2, wherein the regulating means are designed for steady-state, quasi-steady-state and/or non-steady-state regulation of the gas flows during reactor operation.

4. The apparatus as claimed in any of claims 1 to 2, wherein the gas flow regulating means are designed for the continuous regulation of volume, pressure, temperature and/or velocity conditions of the gas flows.

5. The apparatus as claimed in claim 4, wherein the gas flow regulating means have at least one continuously controllable fan (V1, V2, V3) and control valves (R1 to R17).

6. The apparatus as claimed in claim 5, wherein the fan can be actuated manually, under program control and/or by means of a computer.

7. The apparatus as claimed in any of claims 1 to 2, wherein the gas flow regulating means are designed for periodically or aperiodically alternating reversal of direction of the gas flows.

8. The apparatus as claimed in any of claims 1 to 2, wherein the gas flow regulating means are designed for regulation of the gas flows to achieve laminar or turbulent flow.

9. The apparatus as claimed in claim 8, wherein the regulating means are designed for periodically or aperiodically alternating change between laminar and turbulent flow.

10. The apparatus as claimed in claim 8, wherein the gas flow regulating means have control valves (R1, R2, R4, R5, R8, R9, R10, R12) and/or displaceable obstacles to flow and are designed for alternating change of the positions of the control valves or of the obstacles to flow.

11. The apparatus as claimed in any of claims 1 to 2, wherein the gas flow regulating means have measuring means for measuring the temperature of the reactor air and/or of the compost pile, in conjunction with set point adjusters, comparators and controllers for process-dependent control or regulation of the temperature of the reactor air and/or of the compost pile.

12. The apparatus as claimed in any of claims 1 to 2, wherein the gas flow regulating means have measuring means for determining temperature differences in the compost pile and/or for determining the variables of state of the gas flows and/or of the waste air (temperature, humidity, $O_2/CO_2$ ratio, gas pressure, flow velocity and/or throughput volume), in conjunction with set point adjusters, comparators and regulators for controlling or regulating temperature differences in the compost pile and/or variables of state of gas streams and/or of waste air.

13. The apparatus as claimed in any of claims 1 to 2, wherein the gas flow regulating means are designed for operating the gas flows as a closed air circulation system with or without fresh air feed.

14. The apparatus as claimed in claim 13, wherein the gas flow regulating means have valves (R16, R17) for defined adjustment of the ratio of fresh air inlet to circulated air discharge.

15. The apparatus as claimed in claim 13 having a plurality of separate reactors, in which an associated air circulation system is designed as a controlled central aeration means and at least one reactor or a plurality of reactors, has or have associated means for reactor-independent and individual adjustability of the process parameters determining microbial conversion.

16. The apparatus as claimed in claim 15, wherein the reactors alternatively can be connected, via control valves (R1in . . . RNin), to the central aeration means (11, 12, 13).

17. The apparatus as claimed in claim 15, wherein the reactors (RX1 to RXN) are each equipped with their own controllable fresh air feed (LF, RF16).

18. The apparatus as claimed in any of claims 1 to 2, having conditioning means for conditioning the gas flows.

19. The apparatus as claimed in claim 18, wherein the conditioning means for conditioning the gas flows has means for adjusting temperature, pressure and ingredients, including the content of nitrogen, oxygen, carbon dioxide, ammonia and water.

20. The apparatus as claimed in any of claims 1 to 2, having a turn-over means for mechanically turning over the compost pile.

21. The apparatus as claimed in claim 1 or 2, wherein the reactor has one reactor zone adjacent to a top side of the compost pile and one reactor zone adjacent to a bottom side thereof, the reactor zones adjacent to the compost pile each being capable of being interconnected via gas flow lines and control valves.

22. The apparatus as claimed in claim 21, wherein the gas flow lines and control valves are arranged in groups symmetrically with respect to the reactor (RX1 to RXN).

23. The apparatus as claimed in claim 21, wherein the reactor zones located above and below the compost pile are each connected to the other, on both sides of the reactor, via a gas flow line having in each case a first control valve (R1, R2).

24. The apparatus as claimed in claim 23, wherein a second control valve (R4, R8, R10, R12) is arranged in the gas flow line, one on each of the two sides of the first control valves (R1 and R2).

25. The apparatus as claimed in claim 24, wherein at least one fan (V1, V2) is connected via a third control valve (R11, R13) downstream of it, to a point in the gas flow line which is located between the first and the second control valve (R2, R4; R2, R10).

26. The apparatus as claimed in claim 25, wherein the gas flow line (K4) which connects to one another those ends of the reactor zones above and below the compost pile which face away from the fans (V1, V2) has, at a point between its first and second control valves (R1, R8; R1, R12), a branch for an air circulation line (K6).

27. The apparatus as claimed in claim 26, wherein the air circulation line (K6) is equipped with a fifth control valve (R14).

28. The apparatus as claimed in claim 21, wherein a air circulation line (K6) branches into two further lines namely a line (K5) connecting with the means (11) for conditioning circulated air and a line (K52) connecting with the reactor (RX1 to RXN).

29. The apparatus as claimed in claim 28, wherein the line (K52) connecting with the reactor (RX1 to RXN) is branched into two further branch lines (K10o, K10u), each of which is equipped with a fourth control valve (R5, R9), and one of which connects with the upper reactor zone and the other with the lower reactor zone.

* * * * *

UNITED STATES PATENT AND TRADEMARK OFFICE
CERTIFICATE OF CORRECTION

PATENT NO. : 5,869,327
DATED : February 9, 1999
INVENTOR(S) : Klaus GRABBE, et al.

It is certified that error appears in the above-identified patent and that said Letters Patent is hereby corrected as shown below:

Claim 25, col. 17, line 11, change "connected via"

to --connected, via--.

Claim 28, Col. 18, line 6, change "a air"

to --an air--.

Signed and Sealed this

Twenty-ninth Day of June, 1999

Attest:

Attesting Officer

Q. TODD DICKINSON

Acting Commissioner of Patents and Trademarks